United States Patent
Marton et al.

(10) Patent No.: US 8,212,854 B2
(45) Date of Patent: Jul. 3, 2012

(54) SYSTEM AND METHOD FOR ENHANCED TELECONFERENCING SECURITY

(75) Inventors: Trygve Frederik Marton, Oslo (NO); Espen Holmbakken, Oslo (NO); Bjørn Winsvold, Tranby (NO)

(73) Assignee: Cisco Technology, Inc., San Jose, CA (US)

( * ) Notice: Subject to any disclaimer, the term of this patent is extended or adjusted under 35 U.S.C. 154(b) by 1435 days.

(21) Appl. No.: 11/729,935

(22) Filed: Mar. 30, 2007

(65) Prior Publication Data

US 2007/0263085 A1   Nov. 15, 2007

(30) Foreign Application Priority Data

Mar. 31, 2006   (NO) .................................. 20061463

(51) Int. Cl.
   *H04N 7/15*   (2006.01)
(52) U.S. Cl. ................... 348/14.08; 348/14.01
(58) Field of Classification Search ............... 348/14.08, 348/14.09, 14.01
   See application file for complete search history.

(56) References Cited

U.S. PATENT DOCUMENTS

| | | | |
|---|---|---|---|
| 5,745,161 A | 4/1998 | Ito | |
| 5,900,906 A | 5/1999 | Murakumo et al. | |
| 5,959,662 A * | 9/1999 | Shaffer et al. | 348/14.08 |
| 6,094,214 A | 7/2000 | Katsumi | |
| 2002/0159394 A1 | 10/2002 | Decker et al. | |
| 2005/0018687 A1 | 1/2005 | Cutler | |

FOREIGN PATENT DOCUMENTS

| | | |
|---|---|---|
| JP | 7-170334 | 7/1995 |
| JP | 7-170505 | 7/1995 |
| JP | 8-149430 | 6/1996 |
| JP | 8-181899 | 7/1996 |
| JP | 10-171886 | 6/1998 |

* cited by examiner

*Primary Examiner* — Stella Woo
(74) *Attorney, Agent, or Firm* — Oblon, Spivak, McClelland, Maier & Neustadt, L.L.P.

(57) ABSTRACT

A method and system with means for preventing unauthorized monitoring of a local conference room in which a local conferencing system is located comprising generation of a deterministic sound signal, and loading the deterministic sound signal on a first loudspeaker connected to, or integrated in the conferencing system, detecting the deterministic signal by analyzing a microphone signal picked up by a microphone connected to, or integrated in the conferencing system, and transferring the conference system into a security mode, if the deterministic signal is not detected.

18 Claims, 4 Drawing Sheets

SYSTEM AND METHOD FOR ENHANCED TELECONFERENCING SECURITY

FIELD OF INVENTION

The present invention relates to video conferencing systems, and more particularly, to security measures for video conferencing systems.

BACKGROUND OF THE INVENTION

Video conferencing is interactive two-way visual and audio communication between two or more parties who are geographically separated.

FIG. 1 shows a conventional conferencing system set-up. For simplicity, FIG. 1 shows the conferencing system set-up distributed at two sites, A and B. The two sites are connected through a transmission channel 1300 and each site has a loudspeaker 5A and 5B, respectively, and a microphone 4A and 4B, respectively. The arrows in FIG. 1 indicate the direction of propagation for an acoustic signal, usually from the microphone to the loudspeaker.

FIG. 2 illustrates a typical video conferencing room 1, with a video conferencing system 2. Video conferencing systems 2 usually consist of the following components; a codec 10 (for coding and decoding audio and video information) comprising an internal loudspeaker (not shown), a user input device 8 (i.e. remote control or keyboard), a video capture device 6 (camera), an audio capture device 4 (microphone), a video display 9 (screen) and an audio reproduction device 5 (loudspeakers). However, not all systems are alike, and the integration level of these components can vary greatly between different models.

The level of integration span from fully integrated systems where all of these components are combined into one unit, to so-called set-top systems, where a box containing only a camera 6 and codec 10 can be placed on top of any television set. A television set usually contains both speakers 5 and a screen 9, which is then used to play audio and display video from the codec 10 in the set-top system. In the latter case, the audio playback device 5 is usually controlled by the channel selection, and is therefore always playing back the audio signal associated with the selected channel or video signal.

Newer plasma and LCD screens are thinner than traditional CRT television sets, with little or no space for set-top systems. The codec 10 must therefore be placed elsewhere, but cameras 6 are still typically placed on top of the combined audio and video playback device.

Industrial espionage is an increasing problem in many countries, and the rapid pace of technology is making espionage, such as eavesdropping, ever more of a potential problem for companies today. Confidential information and/or prototypes are desirable objects both to business competitors, and to employees seeking to strike out on their own with the company's hard work, trade secrets and other intellectual property as their personal start-up capital. Confidential information are usually acquired by people who are on the payroll and are bribed, or people who gain employment, or are placed on the payroll by a competitor, for the express purpose of acquiring sensitive data.

Videoconferencing systems 2 are typically placed in meeting rooms 1 where sometimes confidential information is discussed or prototypes are exhibited. Due to the fact that the codec 10 is not controlling the television/monitor, it cannot reliably verify that the television/monitor is actually turned on, or has the right input or channel selected to play back audio (and display video) coming from the codec 10. Therefore, people in this meeting room 1 might not realize that the video conferencing equipment 1 might be in a call and transmit sensitive audio and video to a remote user. Consequently, an unauthorized far end party can listen in on a meeting, without the near end party detecting this eavesdropping. This is a serious security problem.

Video conferencing systems 2 with separate video/audio systems (television sets, projectors etc.), or fully integrated systems where the screens can be turned off, has shown to constitute a security risk. Modern video conferencing systems 2 are typically configured to "auto-answer", meaning that the system automatically accepts any incoming call. If, in such cases, the television/monitor is switched off or displaying images from another source (DVD, cable TV, computer etc.), and a remote user dials in to the meeting room 1, the call-signal will not be heard because the television set is turned off, hence also the speakers 5.

Even if the video conferencing equipment 2 is not set to auto-answer, there are ways to connect a call unnoticed. As already mentioned, employees may be interested in information being discussed in a meeting room 1, either for the employees own benefits or spying for a competitor. Employees usually have access to the meeting rooms 1 and the equipment within them. By setting up a conference call and switching off the display unit 9 before a meeting starts, the remote party can listen in on the meeting unnoticed, as discussed above.

In modern office buildings, meeting room walls 3 are often made of glass or other transparent or semi-transparent materials, thru which infrared radiation may be transmitted. Employees or persons with access to the building (visitors, craftsmen etc.) could therefore answer or initiate a call from outside the meeting room by using a remote control 8.

PRIOR ART

A typical approach for overcoming the above-mentioned problem has up to now been a visual indication 7 that a call is active on the set-top system or on the camera itself, e.g. a light emitting diode (LED) or some other type of light source is turned on when the videoconference equipment 2 is in a call. However, people will not always notice this visual indication 7, either because they are less familiar with the equipment or perhaps just used to seeing this light, because of regular use of the equipment. Another problem can be that the codec 10 itself is placed elsewhere, and that the visual indication 7 for this reason is out of sight.

Security systems have been described to prevent eavesdropping through video conferencing systems. U.S. Pat. No. 5,959,662 describe a security system within a local video conferencing system which monitors activity in the meeting room where the local video conferencing system is stationed, and automatically disconnects the conference call if no activity is detected after a predetermined period of time. If activity is detected after a period without activity, users of the local conferencing system are alerted that a call is in progress. However, this security system will not be satisfactory in systems where the audio/video playback device can be switched of or display images from another source.

Most regular videoconferences start off with either an alerting tone or dial tones. These tones are generated by the codec, and can be used to determining whether the audio playback unit is turned on and playing sound from the codec. This however, does not guarantee that the speakers remain turned on indefinitely during the conference, and the tones would have to be repeated with a certain interval to provide the required security of the conference. The repeating sound would however be very disturbing to the participants of the meeting.

A satisfactory detection system for providing a security in a conference room should be able to verify that there is a continuous connection between the loudspeaker and the microphone, regardless of the loudspeaker volume setting or far-end muting of the microphones. It is also important that it does not provide any disturbance to the people in the conference room by emitting any audible sounds.

SUMMARY OF THE INVENTION

It is an object of the present invention to provide a system and method to verify a connection between the loudspeaker and the microphone in a video conference system without disturbing users with audible sounds, and to terminate ongoing calls and/or alert the local users if the system fails to verify a connection.

The features defined in the independent claim enclosed characterise this system. The present invention discloses a method and system for preventing unauthorized monitoring of a local video conference room 1 in which a local video conferencing system 2 is located, by generating a deterministic audio signal, and loading the deterministic audio signal on a speaker 4 connected to, or integrated in the video conferencing system 2, and detecting the deterministic signal by analyzing a microphone signal picked up by a microphone 4 connected to, or integrated in the video conferencing system 2, and transferring the video conference system 2 into a security mode, if the deterministic signal is not detected.

BRIEF DESCRIPTION OF THE DRAWINGS

In order to make the invention more readily understandable, the discussion that follows will refer to the accompanying drawings.

BEST MODE OF CARRYING OUT THE INVENTION

In the following, the present invention will be discussed by describing preferred embodiments, and by referring to the accompanying drawings. However, even if the specific embodiments are described in connection with video conferencing, people skilled in the art will realize other applications and modifications within the scope of the invention as defined in the enclosed independent claims.

In particular, the present invention discloses a video conferencing system utilizing a security system and method for preventing unauthorized intrusions upon a video conferencing room. More precisely, the invention concerns video conferencing system with audio/video reproducing systems, where the audio and video channels are concurrently controllable, independently of the codec.

Figure 1:
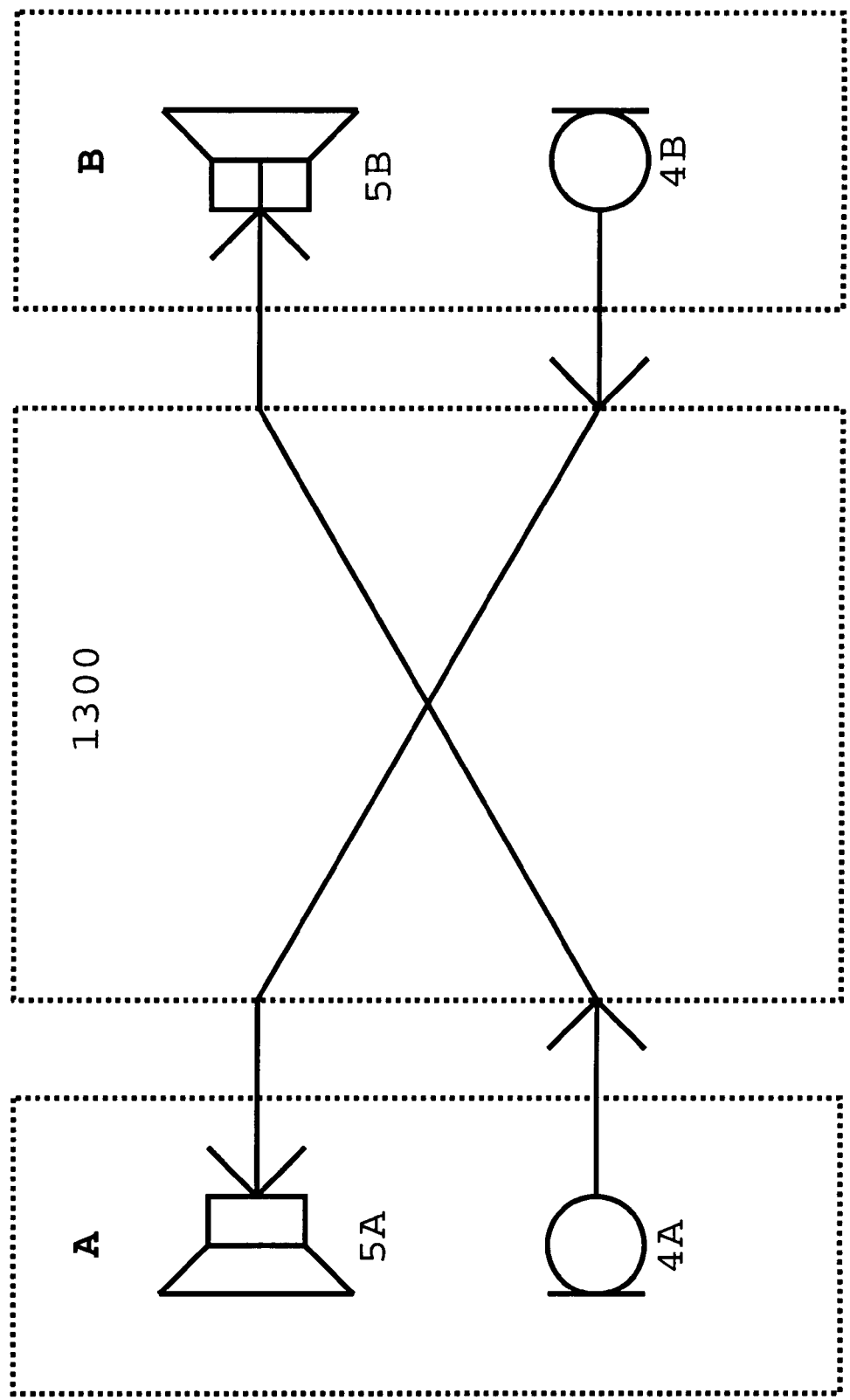
FIG. 1 is an overview block diagram of a conventional conferencing system set-up.

As said FIG. 1 shows a conventional conferencing system set-up. For simplicity, FIG. 1 shows the conferencing system set-up distributed at two sites, A and B. The two sites are connected through a transmission channel 1300 and each site has a loudspeaker 5A and 5B, respectively, and a microphone 4A and 4B, respectively. The arrows in FIG. 1 indicate the direction of propagation for an acoustic signal, usually from the microphone to the loudspeaker.

Figure 2:
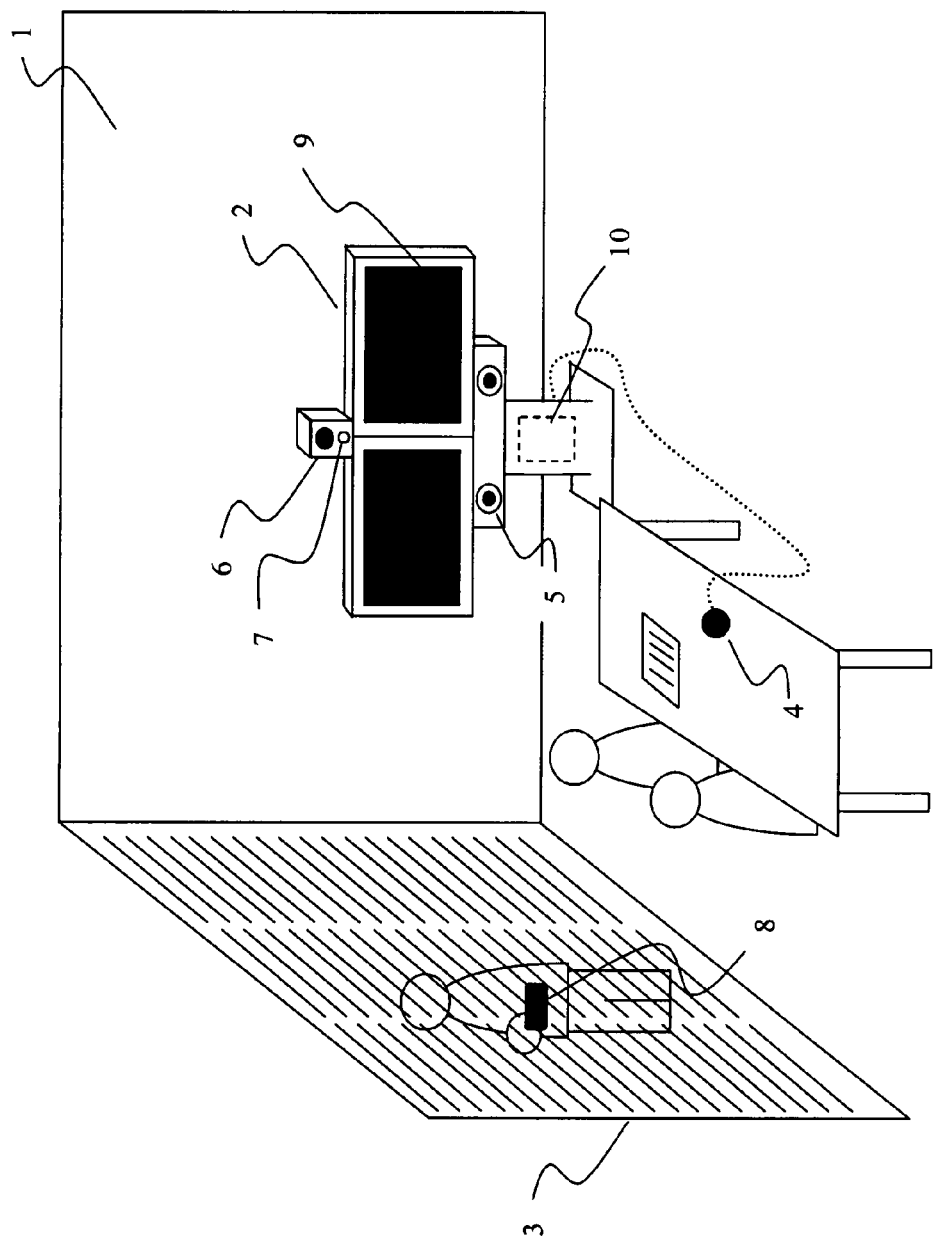
FIG. 2 illustrates a typical video conferencing room.

FIG. 2 illustrates a typical video conferencing room 1, with a video conferencing system 2. Video conferencing systems 2 usually consist of the following components; a codec 10 (for coding and decoding audio and video information) comprising an internal loudspeaker (not shown), a user input device 8 (i.e. remote control or keyboard), a video capture device 6 (camera), an audio capture device 4 (microphone), a video display 9 (screen) and an audio reproduction device 5 (loudspeakers). However, not all systems are alike, and the integration level of these components can vary greatly between different models.

As will be described in detail below, the videoconferencing system according to the present invention constantly verifies a connection between the loudspeaker and the microphone, in order to be certain that the audio and video signals from the codec is being played back on the audio/video reproducing system.

Figure 3:
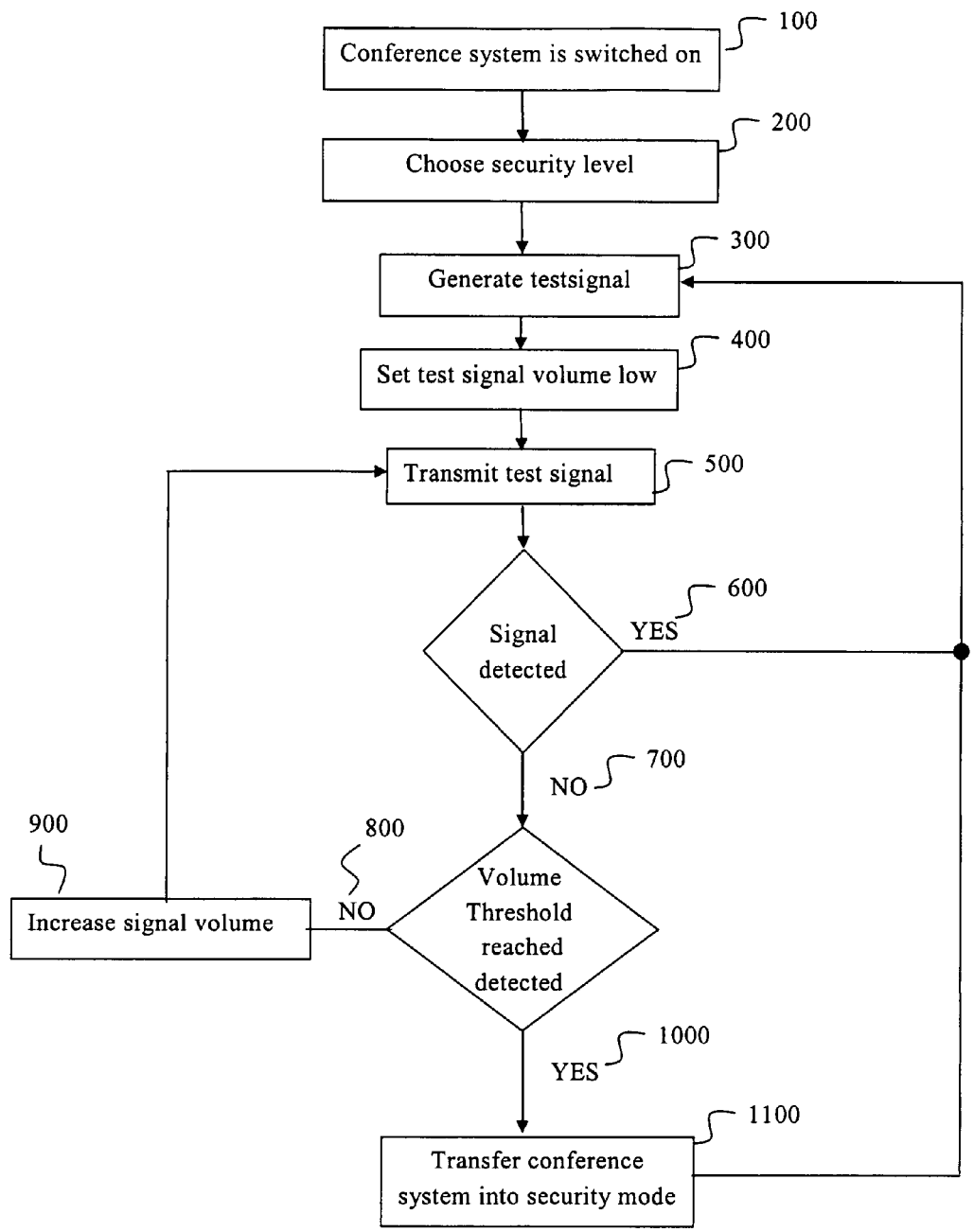
FIG. 3 is a functional flow diagram that illustrates the operation of a video conferencing system according to one embodiment of the present invention to prevent unauthorized monitoring of a local meeting room.

FIG. 3 is a flow chart that illustrates the steps performed by the present invention to prevent the unauthorized monitoring of a video conferencing room. When the local video conferencing system is switched on 100, an appropriate security level 200 should be set for the system. If no active selection is made by the user, a default security level is used. Security levels will typically span from "no security" to "maximum security", with several intermediate levels. Several types of television sets and other audio/video reproduction systems exist on the marked today, and some of them might have solutions where the audio and video playback devices are not controlled concurrently. In this case, the system may verify a connection between the speaker and microphone, but the screen may still be turned off or display images from another source. Therefore, if the highest security level is chosen, the video conferencing system will periodically warn the user that a conference call is active. The highest security level may cause disturbance to the participants of the conference call, and should not be a default setting. To prevent spies from changing the security settings, all security settings must be password protected.

Once a security level is set, the video conferencing system will initiate the verification phase. By verifying a connection between the loudspeaker and the microphone, the system verifies that the user will receive system information from the codec on the screen, and that the call signal will be heard on the speaker. In order to verify the connection, the codec generates a test signal. The test signal may be any sound. However, in order not to disturb the people present in the conference room, it is preferable to use a test signal inaudible to the human ear. The sound could be in a frequency range outside the human perception area, or audible frequencies concealed in the background noise of the room by a psychoacoustic effect. There should be an initiation phase in the verification process, where the system automatically finds the required level of the test signal. The volume level of the test signal is initially set relatively low 400, and is then emitted 500 on the systems loudspeaker. If the signal is not detected 800, the volume level is increased 900 in case the signal was buried in the background noise of the room, and the test signal is reemitted 500. The system should continue its detection phase, and until a connection is verified it should keep increasing the volume of the signal up to a certain threshold. After detection 600 has been verified, the system should continue to monitor the connection between speaker and microphone.

If the signal is not detected within a certain time limit, or a volume level threshold has been reached 1000, the detection fails. If the detection fails, the conference system is transferred into a security mode 1100. Depending on the selected security level, the transfer into a security mode may result in various security measures. One security level may block the conference system from making or accepting any conference calls. If it is already in a conference, the system should enter a "warning state". Another security level may allow the conference system to accept calls, but force the system into the "warning state" if a call is connected. If it is already in a conference, the system should enter the "warning state". If the system enters the "warning state", audio transmission should be terminated, and either a warning sound is emitted, or some other procedure can be undertaken to warn people that privacy is not guaranteed. Since the detection most likely failed because the loudspeaker was turned off, the warning sound must be emitted from an independent audio reproduction device, e.g. the codec's internal loudspeaker. Transmitted video may or may not be stopped as well when entering the "warning state".

Videoconferencing equipment already contains advanced algorithms to evaluate or modify the signal that is being picked up from the microphone or being played on the loudspeakers.

In one embodiment of the present invention the existing connection between the loudspeakers and the microphone is utilized to verify that audio played back from the codec is actually heard in the room.

As mentioned above, the test signal could theoretically be generated in frequencies outside the human perception area to avoid disturbance. Working with signals in this frequency range would of course be a huge advantage, considering that the signal would be inaudible to the human ear without further signal processing. However, frequencies in this range can not be reproduced by all television systems, and can therefore not be considered a reliable solution. Therefore, by using signal processing and knowledge of the human auditory system, an audio signal is generated that can be played on any loudspeaker, and be extracted from the microphone signal, but is not audible for the human ear.

In order to be able to verify a connection between the speaker and the microphone, the speaker must emit a deterministic signal that is compared to the signal being picked up from the microphone. A correlation calculation between the emitted and the received audio signal is performed, and if the correlation is above a set threshold, a connection is verified. Since the videoconferencing equipment is usually stationed in meeting rooms with large groups of people and moving objects, the emitted signal is required to be robust against noise and other disturbances.

The maximum length sequence method is commonly used for impulse response measurement, and since it is based on the cross-correlation technique it is highly immune to extraneous noise of all kinds. Coughs, clicks, footsteps etc. will all be transformed into benign noise distributed evenly over the entire impulse response. The Maximum Length Sequence (MLS) signal is a pseudo-random binary sequence, represented by +1 and −1. An important property of any MLS, is that its auto-correlation function is essentially an impulse, and can be represented by the Dirac delta function. The result of convolving a sequence with a Dirac delta function is the sequence itself. Hence, the impulse response can be found by cross-correlating the emitted signal (MLS) with the received signal. It also has cyclic properties, which reduces the problem of synchronization, and facilitates the measurements to be averaged over time. The sequence has a flat frequency response, hence sounding like white noise, but with a periodicity due to its cyclic properties.

The human auditory system (HAS) is very sensitive to additive white noise, even at very low signal levels. A MLS signal introduced over the whole frequency range would therefore have to be kept at an extremely low signal level in order not to disturb the conference, which in turn would make the detection of the signal very difficult.

In order to better simulate the HAS, videoconferencing equipment usually splits the auditory frequency band into sub bands. In addition, this sub band model drastically reduces and distributes the computational load.

Since the MLS signal has similar spectral properties as true random white noise and the HAS is sensitive to such noise, the MLS signal must somehow be hidden in the background noise. One way to do this is to take advantage of the sound masking phenomenon.

The masking effect of sounds is well known within audio technology. Spectral masking tends to occur in sounds with similar frequencies, for example a powerful spike at 1 kHz will tend to mask out a lower-level tone at 1.1 kHz. A sound close in frequency to the louder sound is more easily masked than if it is far apart in frequency.

The tonality of a sound partially determines its ability to mask other sounds. A sinusoidal masker requires a higher intensity to mask a noise-like signal than a loud noise-like masker does to mask a sinusoid.

In order to make the excitation signal inaudible, a narrowband signal should be used, based on the masking of a wideband signal. The videoconferencing system constantly monitors the average background noise level of the room. The background noise is a wideband signal, and by generating the MLS signal in only certain frequency sub bands, it is possible to generate a narrowband signal, which is sufficiently masked by the background noise in the room.

The masking threshold of the room is therefore calculated for each frequency sub band, and the most suitable frequency bands are chosen. It is important that these bands are not too close to each other in order to preserve its narrowband appearance. These sub bands are then converted to a full band signal, and is added to the original loudspeaker signal before it is loaded on the loudspeaker. The signal is added after the volume setting gain, and the level is therefore independent of user-controlled volume setting or muting.

To be sure that the meeting rooms security is at no point compromised, the transmission of the MLS signal is continued indefinitely. MLS sequences are commonly used to identify the impulse response of a room, and each time the MLS sequence of length L is transmitted and received, a measure of the correlation, or impulse response, is calculated. The impulse response can be found by convolving the received signal with a time-reversed version of the original MLS signal.

Only the sub bands where the excitation signals exist are evaluated. In these sub bands the received signal is convolved with the time reversed version of the original MLS sequence to obtain an impulse response for each of the given sub bands. The process of convolving a received signal with a time-reversed version of the corresponding emitted signal is called matched filtering. The matched filter tries to maximize the output signal-to-noise ratio (SNR) between a filtered deterministic signal in stochastic additive noise. If the output of the filter is normalized to vary between 0 and 1, then 1 will indicate that there is a high probability that the signal was transmitted, and 0 indicate a low probability that the signal was transmitted. The output of the matched filter is also referred to as the correlation between the received and the transmitted signal.

As the excitation signal level is based on the average background noise level in the room, there is a risk of not detecting a correlation in the presence of high-energy disturbances in the sub bands we are using. In order to make the detection system more robust, averaging techniques are applied. Instead of discretely verifying a connection each time the deterministic signal is emitted, every odd measurement is added to an average of odd measurements, while every even measurement is added to an average of even measurements. The result is two time averaged impulse response measurements for each of the evaluated sub bands. Time averaging of the impulse response measurements greatly improves the signal to noise ratio (SNR), and consequently reduces faulty detections.

Figure 4:
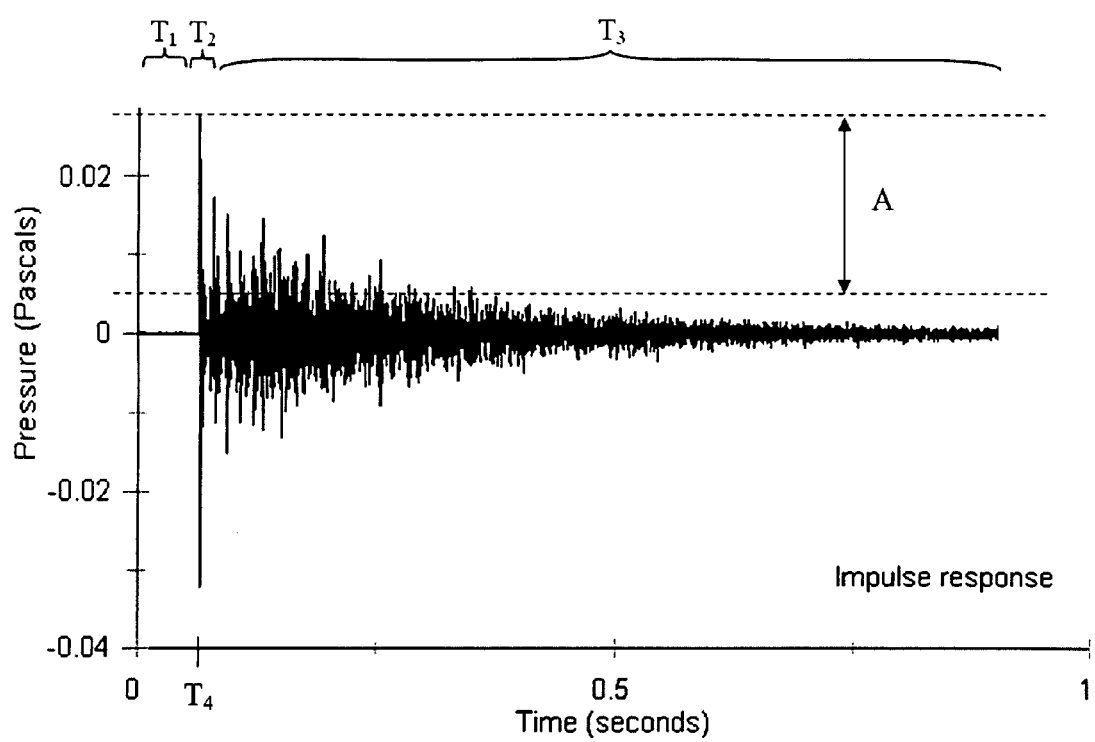
FIG. 4 shows a typical impulse response.

Another noise problem may arise when the background noise is periodic. If the periodicity of the noise signal matches the periodicity of the test signal, the measure of the correlation of two consecutive measurements may appear similar, even though no test signal is actually emitted on the loudspeaker. If only a measure of correlation between the two measurements is used to determine a connection between the loudspeaker and the microphone, an incorrect verification can occur. Therefore, in order to maximize the probability of a correct impulse response measurement, knowledge about impulse response properties is used to verify that the measurements are actual impulse responses. As can be seen from FIG. 4, a typical room impulse response has initially low energy T1, due to the delay between the loudspeaker and the microphone (and other delays in the system), followed by a strong peak T2 that indicates the direct sound between the loudspeaker and the microphone, after which the amplitude decreases logarithmically in the area T3 due to the reverberation in the room. By analyzing the measurements and calculating certain characteristic values (the position T4 of the strongest peak T2, the difference in amplitude A between the strongest peak T2 and the average in area T3, etc.), it can be determined if a measurement resemble an impulse response measurement. If a measurement lacks impulse response properties, the measurement from this sub band should be discarded.

Further, in order to maximize the probability of a correct impulse response measurement, the measurements from each of the evaluated sub bands are weighted with the inverse of the microphone energy before it is being added to the average. In other words, if strong microphone energy is detected in some of the evaluated sub bands, the impulse response measurements in these sub bands might be corrupted and is therefore weighed down. The energy weighted impulse response measurements are then compared by correlating the two time averaged impulse responses from each sub band, weighting the peak parts T2 of the impulse response stronger. The strong peak T2 carry significantly more energy, and is less likely to vary compared to the lower energy parts T3 in the impulse response. The correlation result of all evaluated sub bands are then added together, and normalized with respect to the energy of the impulse responses. If this measurement variable is close to one, it indicates that the two impulse measurements are equal, which again indicates that there is a strong correlation between the emitted and received signal. Of course, the procedure can be used with more than two time averaged impulse response measurements.

E.g. when using four time averaged impulse response measurements (TA1, TA2, TA3 and TA4), the correlation measurements are then performed on all the six possible combinations of measurements (TA1*TA2, TA1*TA3, TA1*TA4, TA2*TA3, etc.), and the correlation measurement with the lowest value is selected. If this measurement variable is close to one, it indicates that the impulse measurements are equal, which again indicates that there is a strong correlation between the emitted and received signal.

The number four is used for illustrative purposes, and it is obvious for a person skilled in the art that any number of time averaged measurements may be used.

The method described above can be processed in sub bands or full band, but the use of sub bands greatly reduces the computational complexity.

This method has the advantage that it actively detects the security problem state and makes sure that sensitive audio and video is never transmitted without the people in the room being aware of that this is happening.

Further, the system detects the security problem without unnecessarily disturbing the conference room with annoying sounds.

The invention claimed is:

1. A method of preventing unauthorized monitoring of a local conference room in which a local conferencing system is located, the method comprising:
   i. generating a deterministic sound signal at the local conferencing system, and loading the deterministic sound signal on a first loudspeaker connected to, or integrated in the local conferencing system;
   ii. detecting the deterministic sound signal by analyzing an audio signal picked up by a microphone connected to, or integrated in the local conferencing system; and
   iii. transferring the local conferencing system into a security mode, if the deterministic sound signal is not detected.

2. The method according to claim 1, wherein said deterministic sound signal is an audio signal, inaudible to a human auditory system.

3. The method according to claim 1 or 2, further comprising:
   ii a increasing a volume level of said deterministic sound signal and repeating the step i and ii if said detection fails; and
   ii b continuing to step iii if said deterministic sound signal has not been detected within a predefined period of time or after a volume threshold has been reached.

4. The method according to claim 1, wherein the step of transferring the local conferencing system into a security mode further includes at least one of blocking or terminating all calls to and from the local conferencing system, or at least one of blocking or terminating audio transmissions.

5. The method according to claim 1, wherein the step of transferring the local conferencing system into a security mode (1100) further includes loading an alarm signal on a second loudspeaker connected to, or integrated in a codec in the local conferencing system.

6. The method according to claim 1, wherein the deterministic sound signal is generated by
   iv. splitting an auditory frequency band from the microphone into several sub bands,
   v. determining a masking threshold of the local conference room for each sub band,
   vi. choosing frequency bands for masking said deterministic sound signal in background noise of the local conference room, and
   vii. converting said frequency bands for masking to a broadband signal, and adding said broadband signal to said deterministic sound signal.

7. The method according to claim 1, wherein the deterministic sound signal is a maximum length sequence (MLS) signal.

8. The method according to claim 1, wherein the deterministic sound signal is detected by
iv. convolving the audio signal picked up by the microphone with a time-reversed version of an original emitted signal to obtain an impulse response measurement,
v. adding every odd measurement to an average of odd measurements, and adding every even measurement to an average of even measurements,
vi. correlating two time averaged impulse responses, weighting peak parts of the two time averaged impulse responses stronger, and
vii. verifying a detection if an output from said correlating exceeds a set threshold value.

9. The method according to claim 1, further comprising
iv. dividing the audio signal picked up by the microphone into sub bands,
v. convolving the audio signal picked up by the microphone with a time-reversed version of an original emitted signal to obtain an impulse response measurement for each sub band containing the original emitted signal,
vi. measuring microphone energy in each sub band containing the original emitted signal,
vii. adding every odd measurement to an average of odd measurements, and adding every even measurement to an average of even measurements, for each sub band containing the original emitted signal, weighting impulse response measurements with an inverse of the microphone energy before they are added to the average,
viii. correlating two time averaged impulse responses for each sub band containing the original emitted signal, weighting peak parts of the two time averaged impulse responses stronger,
ix. adding a result of the correlating of all evaluated sub bands, and normalizing with respect to an energy of the two time averaged impulse responses, and
x. verifying a detection if said normalized correlation result exceeds a set threshold value.

10. A system for preventing unauthorized monitoring of a local conference room in which a local conferencing system is located, the system comprising:
at least a codec that codes and decodes at least audio information;
a microphone;
a loudspeaker;
a signal generator configured to generate a deterministic sound signal, and to load said deterministic sound signal on the loudspeaker connected to, or integrated in the local conferencing system;
a signal detection device configured to detect said deterministic sound signal by analyzing an audio signal picked up by the microphone connected to, or integrated in the local conferencing system; and
a control unit configured to transfer the local conferencing system into a security mode, if said deterministic sound signal is not detected by said signal detection device.

11. The system according to claim 10, wherein
said signal generator is further configured to generate an audio signal that is inaudible to a human auditory system as said deterministic sound signal.

12. The system according to claim 10, wherein
said signal generator is further configured to increase a volume level of said deterministic sound signal and reload said deterministic sound signal on the loudspeaker, if said signal detection device is unable to detect said deterministic sound signal, and
said control unit is configured to transfer the local conferencing system into the security mode, if said deterministic sound signal has not been detected within a predefined period of time or after a volume threshold has been reached.

13. The system according claim 10, wherein said controller is configured to at least one of block or terminate all calls to and from the local conferencing system when the local conferencing system is transferred into the security mode.

14. The system according to claim 10, wherein said control unit is further configured to load an alarm signal on a second loudspeaker connected to, or integrated in the codec when the local conferencing system is transferred into the security mode.

15. The system according to claim 10, wherein said signal generator is further configured to split auditory frequency band from the microphone into several sub bands,
determine a masking threshold for the local conference room for each sub band,
choose frequency bands for masking said deterministic sound signal in background noise of the local conference room, and
convert said frequency bands for masking to a broadband signal, and add said broadband signal to said deterministic sound signal.

16. The system according to claim 10, wherein said deterministic sound signal is a maximum length sequence (MLS) signal.

17. The system according to claim 10, wherein the signal detection device is further configured to
convolve the audio signal picked up by the microphone with a time-reversed version of an original emitted signal,
add every odd measurement to an average of odd measurements, and add every even measurement to an average of even measurements,
correlate two time averaged impulse responses, weighting peak parts of the two time averaged impulse responses stronger, and
verify a detection if an output from said correlation exceeds a set threshold value.

18. The system according to claim 10, wherein the signal detection device is further configured to
divide the audio signal picked up by the microphone into sub bands,
convolve the audio signal picked up by the microphone with a time-reversed version of an original emitted signal to obtain an impulse response measurement for each sub band containing the original emitted signal,
measure microphone energy in each sub band containing the original emitted signal,
add every odd measurement to an average of odd measurements, and add every even measurement to an average of even measurements, for each sub band containing the original emitted signal, weighting impulse response measurements with an inverse of the microphone energy before they are added to the average,
correlate two time averaged impulse responses for each sub band containing the original emitted signal, weighting peak parts of the two time averaged impulse responses stronger,
add a result of the correlation of all evaluated sub bands, and normalize with respect to an energy of the two time averaged impulse responses, and
verify a detection if said normalized correlation result exceeds a set threshold value.

* * * * *